(12) United States Patent
Vanluchene et al.

(10) Patent No.: US 11,794,642 B2
(45) Date of Patent: Oct. 24, 2023

(54) SKIN FOR A VEHICLE INTERIOR TRIM PART COMPRISING A LIGHT SOURCE

(71) Applicant: ASCORIUM GMBH, Königswinter (DE)

(72) Inventors: Yvan Vanluchene, Wetteren (BE); Geert Trossaert, Wetteren (BE); Linda Dedoncker, Wetteren (BE)

(73) Assignee: Ascorium GMBH, Konigswinter (DE)

( * ) Notice: Subject to any disclaimer, the term of this patent is extended or adjusted under 35 U.S.C. 154(b) by 0 days.

(21) Appl. No.: 17/785,793

(22) PCT Filed: Jan. 13, 2021

(86) PCT No.: PCT/EP2021/050525
§ 371 (c)(1),
(2) Date: Jun. 15, 2022

(87) PCT Pub. No.: WO2021/144285
PCT Pub. Date: Jul. 22, 2021

(65) Prior Publication Data
US 2022/0363190 A1 Nov. 17, 2022

(30) Foreign Application Priority Data
Jan. 16, 2020 (EP) ..................................... 20152320

(51) Int. Cl.
*B60Q 3/54* (2017.01)
(52) U.S. Cl.
CPC .......... *B60Q 3/54* (2017.02); *B60K 2370/339* (2019.05); *B60K 2370/345* (2019.05)

(58) Field of Classification Search
CPC ................ B60Q 3/54; B60K 2370/339; B60K 2370/345; B60K 35/00; B60K 37/06
(Continued)

(56) References Cited

U.S. PATENT DOCUMENTS 7,638,719 B2    12/2009   Pelletier et al.
9,738,219 B1 *   8/2017   Salter ........................ B60Q 3/51
(Continued)

FOREIGN PATENT DOCUMENTS

DE      102006061388 B3      4/2008
DE      102016211074 A1      12/2017
(Continued)

*Primary Examiner* — Laura K Tso
(74) *Attorney, Agent, or Firm* — BROWDY AND NEIMARK, P.L.L.C.

(57) ABSTRACT

The skin (1) comprises at least a translucent elastomeric layer (5) composed of a pigmented plastic material and comprising at least one first portion (8) which is configured to be placed in front of a light source (9). The light of this light source (9) produces an image on this first portion (8) of the translucent layer due to the presence of a surface relief (17, 18) on the surface of the translucent layer (5). A clearly visible image can be obtained by providing even small differences in thickness of the translucent layer (5) when the pigmented plastic material thereof has an average spectral attenuation coefficient ($\alpha_{av}$) of between 1.0 and 25 mm$^{-1}$. The difference in layer thickness ($d_2-d_1$) and the average spectral attenuation coefficient ($\alpha_{av}$) should moreover be large enough to meet the formula: $\alpha_{av}(d_2-d_1) > -\ln a$, wherein a is equal to 0.50. Since the surface relief (17, 18) can automatically be produced when moulding the translucent layer (5) against a mould surface, the image can easily be obtained in the correct position on the skin (1).

19 Claims, 5 Drawing Sheets

(58) Field of Classification Search
USPC .......................................................... 362/488
See application file for complete search history.

(56) References Cited

U.S. PATENT DOCUMENTS

| | | | |
|---|---|---|---|
| 2004/0017687 A1* | 1/2004 | Misaras | B60K 37/06 |
| | | | 362/555 |
| 2010/0214798 A1* | 8/2010 | Salter | B60R 13/02 |
| | | | 362/520 |
| 2015/0307033 A1* | 10/2015 | Preisler | B60Q 3/20 |
| | | | 296/1.08 |
| 2019/0161003 A1 | 5/2019 | Park et al. | |
| 2019/0326908 A1 | 10/2019 | Salter et al. | |

FOREIGN PATENT DOCUMENTS

| | | |
|---|---|---|
| DE | 102018102726 A1 | 8/2019 |
| EP | 0303305 A2 | 2/1989 |
| EP | 0376246 A2 | 7/1990 |
| EP | 0929586 A1 | 7/1999 |
| EP | 2233366 A1 | 9/2010 |
| KR | 101680627 B1 | 11/2016 |
| WO | 9814492 A1 | 4/1998 |
| WO | 2004000905 A1 | 12/2003 |
| WO | 2007137623 A1 | 12/2007 |

* cited by examiner

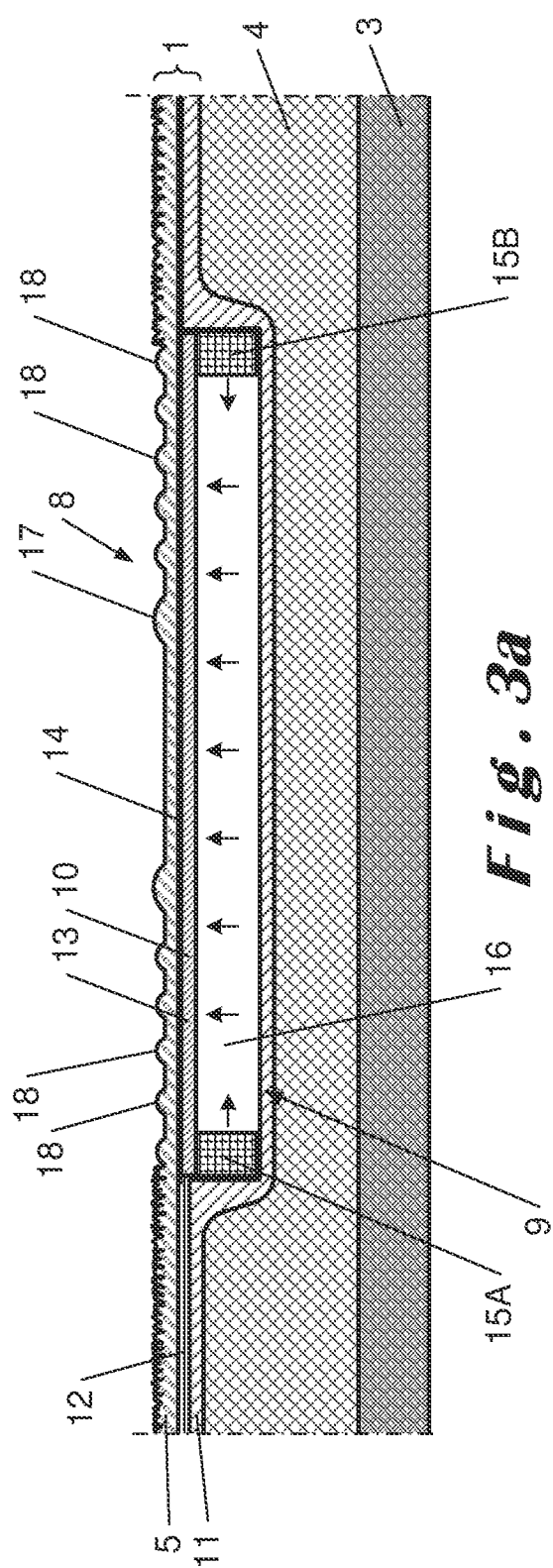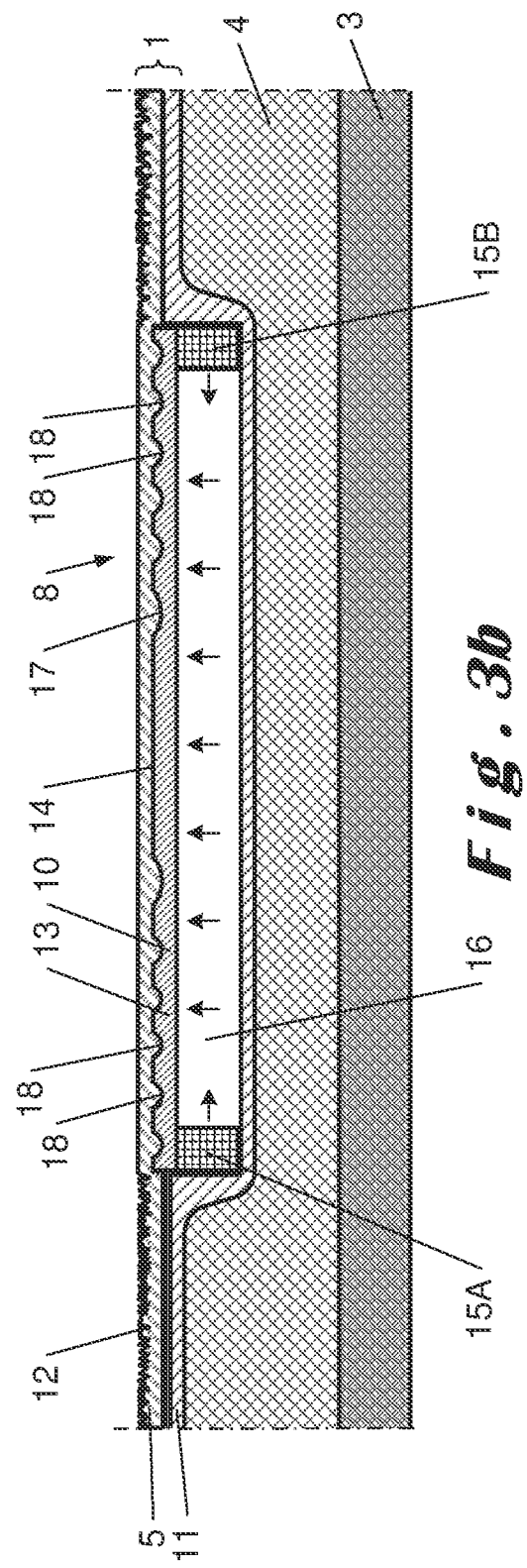

SKIN FOR A VEHICLE INTERIOR TRIM PART COMPRISING A LIGHT SOURCE

The present invention relates to a skin for a vehicle interior trim part. The skin comprises at least a translucent elastomeric layer composed of a normally substantially homogenously pigmented plastic material, the translucent layer having an outer surface and an inner surface opposite the outer surface. The outer surface forms the visible surface, i.e. the so-called A-surface, of the skin. The translucent layer comprises at least one first portion which is configured to be placed in front of a light source and to transmit visible light generated by said light source from said inner surface to said outer surface. The light source is preferably adhered to the inner surface of the translucent layer.

An automotive vehicle such as a car or a truck comprises a lot of electric or electronic components which can be controlled by the driver or passenger. The operating elements such as buttons, switches and sliders used to control the operation of these components are usually mechanically mounted individually or as assemblies in openings in the trim part itself. In between the areas with operating elements, the trim part usually comprises areas formed by an elastomeric skin with optionally other functional or aesthetic parts integrated in the skin. On its outer surface, the elastomeric skin has a surface texture. This texture may be intended to imitate leather but it can also be intended to reduce the gloss of the skin material. This may be important for example on the top of a dashboard to avoid too strong light reflections.

The operating elements may be adhered to the back of the elastomeric skin. They may be provided with a light source so that they become visible through the skin. In the method disclosed in DE 10 2006 061 388 the operating elements are adhered to the back of the skin by producing the skin in accordance with a powder slush process against a mould surface and by applying the operating element against the back of the powder slush skin when the skin material has not yet completely cured. In this way, the operating element adheres to the skin by the adhesive properties of the curing skin material. In a similar method disclosed in EP 2 275 307 the operating element is applied against the back of a first polyurethane skin layer before the reactive material used to produce this skin layer is completely cured. Subsequently a further polyurethane skin layer is sprayed against the back of the first skin layer, and against the back of the operating element, to embed the operating element in the elastomeric polyurethane skin.

In recent years, there has been an increasing interest in integrating operating elements in the skin in such a way that they are almost invisible. Reference can be made for example to U.S. Pat. No. 7,638,719 and US 2019/0326908.

In U.S. Pat. No. 7,638,719 the operating element is a pressure-sensitive element which is covered by the flexible skin material. Since in this way it is invisible to the user, assignment fields are provided on the outer surface of the skin to indicate the presence of the operating elements.

In US 2019/0326908 a proximity sensor and a light source are arranged on the back of the skin. By means of an icon layer in between the light source and the skin, indicia can be projected onto the skin indicating the function of the electric or electronic component controlled by the switch assembly. The switch assembly is hidden unless activated to luminesce by means of the light source. A drawback of the required icon layer is that it renders the operating element more complex and more voluminous.

A similar system is disclosed in US 2019/0161003. It discloses an automotive trim part which comprises an elastomeric skin, a light source and an optical pattern layer in between the skin and the light source. The optical pattern layer enables to produce an image on the skin layer.

In the skin disclosed in KR 101680627 letters or shapes are displayed onto the outer surface of the skin, not by means of an icon or optical pattern layer underneath the skin, but by means of a number of translucent skin colour coating layers and a mask layer underneath these coating layers. The letters or shapes are produced by cutting away portions of the coating layers and of the mask layer by means of a laser so that at these locations the light of the light source can pass through the skin. A drawback of such a system is that a post treatment laser process has to be carried out to cut the letters or shapes accurately and at the correct locations in the skin. Such a post treatment is not only complex but may also lead to an additional amount of scrap.

An object of the present invention is to provide a new skin with a translucent elastomeric layer through which an image can be produced by means of a light source applied behind said translucent layer without requiring the presence of an icon or optical pattern layer underneath the skin and without requiring an additional post treatment step for example a laser cutting step.

The skin comprises at least a translucent elastomeric layer composed of a pigmented plastic material, the translucent layer having an outer surface and an inner surface opposite the outer surface, and the translucent layer comprising at least one first portion which is configured to be placed in front of a light source and to transmit visible light generated by said light source from said inner surface to said outer surface.

To achieve the object of the present invention, the skin is characterised in that said first portion of the translucent layer comprises a surface relief on the outer surface and/or on the inner surface thereof to produce an image on said first portion when said visible light is transmitted through said first portion of the translucent layer, which surface relief forms at least one first area, where the translucent layer has a thickness which is smaller than or equal to a first thickness ($d_1$) and at least one second area, where the translucent layer has a thickness which is larger than or equal to a second thickness ($d_2$) which is larger than said first thickness ($d_1$), with the difference ($d_2-d_1$) between said first thickness ($d_1$) and said second thickness ($d_2$) being larger than 0.08 mm but smaller than 3.0 mm. The pigmented plastic material has over at least one range of visible light wavelengths an average spectral attenuation coefficient ($\alpha_{av}$), which average spectral attenuation coefficient is the average of spectral attenuation coefficients ($\alpha(\lambda)$) determined for different wavelengths ($\lambda$) in regular intervals, in particular in intervals of 5 nm, over said range of visible wavelengths by the following formula (I):

$$\alpha(\lambda) = -\frac{\ln T_1(\lambda)}{d_1} \qquad (I)$$

wherein:
$d_1$=said first thickness; and
$T_1(\lambda)$=the spectral transmittance at said wavelength ($\lambda$), measured in accordance with EN ISO 13468-2:2006 part 2, of a film of said pigmented plastic material having a uniform thickness equal to said first thickness ($d_1$). In accordance with the invention, the average spectral attenuation coefficient ($\alpha_{av}$) should further be comprised between 1.0 and 25 mm$^{-1}$ and should be related to the difference ($d_2-d_1$) between said first ($d_1$) and said second thickness ($d_2$) according to the following formula (II):

$$\alpha_{av}(d_2-d_1) > -\ln a \qquad (II)$$

wherein:
a=0.50.

The surface relief on the inner and/or on the outer surface of the translucent layer can easily be obtained by producing the translucent layer through a moulding process. The surface relief can either be produced against a surface of a mould or against an insert, in particular against the surface of the light source, which may be previously positioned in the mould. In that way, the image produced by the surface relief is always on the correct location on the skin. Moreover, the image is automatically obtained without requiring any icon or optical pattern layer underneath the translucent layer or without the need of any post treatment step.

The surface relief on the inner or on the outer surface of the translucent layer is preferably a moulded surface relief, i.e. surface relief which is obtained by moulding the translucent elastomeric layer against a solid surface. In case of the inner surface, the surface relief can thus be produced by moulding the translucent layer against an insert layer which has already been positioned in a mould. The translucent layer may thus for example be produced by a reaction overmoulding process (ROM process), in particular by means of a liquid polyurethane reactive mixture. The surface relief is preferably however provided on the outer surface of the translucent layer. The surface relief can be produced on the outer surface by moulding the translucent layer against a textured mould surface, which texture shows the negative of this surface relief. The translucent elastomeric layer may be made of a thermoplastic material which is moulded in a molten state against the mould surface, such as in the slush moulding process. Alternatively, a layer (foil) of such a thermoplastic material may be moulded in a solid state against the mould surface. The solid layer of thermoplastic material is moulded by urging or sucking it with a sufficient pressure against the textured mould surface so that the negative surface relief on the mould surface is transferred onto the skin layer. The skin layer and/or the mould surface is preferably heated to assist the moulding process. The elastomeric layer may also be produced from a reactive mixture, for example a polyurethane reactive mixture, which is applied in a liquid state against the textured mould surface, for instance by a spraying process, and which is allowed to cure against this mould surface.

Notwithstanding the fact that the pigmented elastomeric layer is translucent, it has been found according to the invention that a clearly visible image can be obtained by providing even relatively small differences in thickness of said layer when the pigmented plastic material thereof has an average spectral attenuation coefficient which is selected between 1.0 and 25 mm$^{-1}$. The higher this average spectral attenuation coefficient, and the larger the difference in thickness between the first and the second area of the translucent layer, the larger the contrast between the parts of the image produced by the light transmitted through the thinner first area and the thicker second area of the translucent layer. An average spectral attenuation coefficient higher than 1.0 mm$^{-1}$ makes the translucent layer sufficiently opaque to produce, as usual, a texture thereon which is visible without any illumination from the back of the translucent layer, in particular in areas of the skin which are not provided on their back with a light source. On the other hand, an average spectral attenuation coefficient lower than 25 mm$^{-1}$ is essential to be able to produce a translucent layer which still has a sufficiently high transmittance for a sufficiently large thickness. The transmission (T) is indeed determined by the formula:

$$T = e^{-\alpha \cdot d},$$

wherein:
T is the light transmittance through the translucent layer;
$\alpha$ is the attenuation coefficient of the material of the translucent layer; and
d is the thickness of the translucent layer.

In accordance with the present invention, it has been found that the first, thinner area can be distinguished visually from the second, thicker area when the equation of formula (II) wherein a is equal to 0.50 is met. In other words, the light transmittance through the second area should be smaller than about 50% of the light transmittance through the first area.

In accordance with the invention, the difference in thickness between the first area and the second area to achieve the claimed difference in transmittance between the first and the second area should be larger than 0.08 mm in order to avoid that small thickness variations which are automatically obtained by the production process and which cannot (easily) be avoided, would become visible. The difference in thickness between the first area and the second area to achieve the claimed difference in transmittance between the first and the second area should moreover be smaller than 3.0 mm. In this way no excessively large thickness differences are required to achieve a predetermined difference in transmittance between the first and the second skin area. In other words, the desired image can be obtained with a relatively low surface relief that has in particularly only a minimum effect on the outer appearance of the skin when not illuminated by the light source on the back of the translucent layer.

In an embodiment of the skin according to the present invention, the value a in formula (II) is equal to 0.45, preferably equal to 0.40, more preferably equal to 0.35 and most preferably equal to 0.30.

This means that the light transmittance through the thicker second area comprises at most about 45% or even less of the light transmittance through the thinner first area of the skin resulting in a larger contrast between the part of the image produced by the light passing through the first area of the skin and the part of the image produced by the light passing through the second area of the skin.

In an embodiment of the skin according to the present invention the difference ($d_2-d_1$) between said first thickness ($d_1$) and said second thickness ($d_2$) is larger than 0.10 mm.

In this embodiment the tolerances in skin thickness may be larger without producing visible defects in the image produced by the light passing through the skin since a larger minimum thickness difference is required to achieve a predetermined difference in transmittance between the first and the second skin area.

In an embodiment of the skin according to the present invention the difference ($d_2-d_1$) between said first thickness ($d_1$) and said second thickness ($d_2$) is smaller than 2.0 mm, preferably smaller than 1.5 mm and more preferably smaller than 1.0 mm.

In this embodiment even smaller thickness differences are required to achieve a predetermined difference in transmittance between the first and the second skin area. In other words, the desired image can be obtained with an even lower surface relief, having in particular only a minimum effect on the outer appearance of the skin when not illuminated by the light source on the back of the translucent layer.

In an embodiment of the skin according to the present invention said average spectral attenuation coefficient ($\alpha_{av}$) is larger than 2.0 mm$^{-1}$, preferably larger than 3.0 mm$^{-1}$, more preferably larger than 4.0 mm$^{-1}$ and most preferably larger than 5.0 mm$^{-1}$.

In this embodiment, smaller thickness differences are required to achieve a predetermined difference in transmittance between the first and the second skin area. In other words, the desired image can be obtained with a lower surface relief, having in particular a smaller effect on the outer appearance of the skin when not illuminated by the light source on the back of the translucent layer.

In an embodiment of the skin according to the present invention said average spectral attenuation coefficient ($\alpha_{av}$) is smaller than 20.0 mm$^{-1}$, preferably smaller than 15.0 mm$^{-1}$ and more preferably smaller than 10.0 mm$^{-1}$.

A smaller attenuation coefficient results in a skin having a larger light transmittance for a same skin thickness. At the same time, a larger difference in skin thickness is required to achieve a predetermined dark and light contrast in the image produced by the light source. The particular selection of the attenuation coefficient enables to achieve a clear image with a larger thickness of the translucent layer whilst keeping the required difference in thickness between the thinner and thicker skin areas which produce the image sufficiently small.

In an embodiment of the skin according to the present invention said first portion of the translucent layer has an average thickness which is smaller than 2.0 mm, preferably smaller than 1.5 mm, more preferably smaller than 1.2 mm and most preferably smaller than 1.0 mm. In a further embodiment of the skin according to the present invention said first portion of the translucent layer has an average thickness which is larger than 0.2 mm, preferably larger than 0.3 mm, more preferably larger than 0.4 mm and most preferably larger than 0.5 mm.

The average thickness is a surface weighted average. The average thickness of a portion of the translucent layer is determined by dividing the volume thereof by the surface area of its inner surface.

The thicknesses of the translucent layer as claimed in these embodiments make it particularly suited to be used as a structural layer of the elastomeric skin, i.e. as a layer which contributes to the required mechanical properties of the elastomeric skin.

In an embodiment of the skin according to the present invention said range of visible light wavelengths has a width of at least 50 nm, preferably of at least 75 nm, or preferably of at least 150 nm or preferably of at least 300 nm.

The light source may be a light source, for example a LED, which only emits light within a certain range of wavelengths. When the above described conditions are fulfilled for the range of wavelengths emitted by the light source (for example when the translucent layer comprises a coloured pigment, having in particular a same colour as the light emitted by the light source) the desired image can be produced as described here above. On the other hand, when the light source emits light over a broader range, for example over the entire range of visible light wavelengths, and when the translucent layer comprises a coloured pigment so that mainly light of a particular range of wavelengths/colour is transmitted through the translucent layer whilst the others are mainly absorbed, the effects of the invention can be achieved with the average spectral attenuation coefficient determined over this range of transmitted wavelengths.

In an embodiment of the skin according to the present invention said range of visible light wavelengths is the range from 380 to 780 nm.

This range embraces all the visible wavelengths. The image will thus be produced not only with white light but also with other colours of light. It is thus possible to place two or more light sources behind the translucent layer so that the image can be produced in different colours, depending on which light source is activated. The different light sources can be used alternatively or they can be used together to produce differently coloured portions of the image. A coloured light source may comprise a LED emitting light within a certain range of wavelengths or it may comprise a light source emitting for example white light which is covered by a coloured transparent mask so that coloured light is transmitted through the mask into the translucent skin layer.

In an embodiment of the skin according to the present invention the skin comprises at least one light source which is adhered to the inner surface of said first portion of the translucent layer and which is configured to emit visible light having a predetermined range of wavelengths, said range of visible light wavelengths corresponding to this predetermined range of wavelengths.

In this embodiment, the average spectral attenuation coefficient is thus determined over the range of wavelengths emitted by the light source so that the above described effects are achieved with the use of this light source.

Preferably, the skin comprises an inner elastomeric layer adhered to the inner surface of said translucent elastomeric layer, with said light source being embedded between said translucent elastomeric layer and said inner elastomeric layer.

An advantage of this embodiment is that the light source is entirely shielded off from dust or humidity. Moreover, the light source can easily be integrated completely when moulding the two skin layers against the mould surface and can thus be accurately placed in the required position onto the back of the translucent layer. The light source is thus protected against any damage when transferring the skin to the next mould, in particular a back foam mould, wherein the substrate is adhered to the back of the skin through the intermediary of a foam layer.

The light source may comprise at least one LED, in particular a naked LED, which is embedded between said translucent elastomeric layer and said inner elastomeric layer.

Such naked LEDs are cheaper than embedded LEDs and are moreover less voluminous so that they can be easily integrated in between the two skin layers.

In an embodiment according to the present invention the skin comprises a flat screen display, in particular a LED screen, more particularly an OLED screen, which is adhered to the inner surface of a second portion of the translucent layer, which second portion is configured to transmit visible light generated by said flat screen display from said inner surface to said outer surface.

With the above described attenuation coefficients, in particular with the above described smaller attenuation coefficients as defined in the preferred embodiments, the image of the display can be seen at the outer surface of said second portion of the translucent layer.

Preferably, the inner and the outer surface of said second portion of the translucent layer have a surface texture which is completely smooth or which has a Pt value, measured in accordance with DIN EN ISO 4287:1998, which Pt value, in mm, meets the following formula (III):

$$Pt < -\frac{\ln b}{\alpha_{av}} \quad (III)$$

wherein b is larger than 0.50, preferably larger than 0.60 and more preferably larger than 0.70.

In this embodiment, the image of the display is not or only minimally distorted by the presence of any surface texture on the outer or inner surface of the translucent layer. In the same way as on said first portion of the translucent layer, also the second portion of the translucent layer can be provided with a surface relief to produce also on this second portion an additional image when the surface relief is illuminated by the display. This additional image can be positioned to have no or only a minimum effect on the image produced by the flat screen display itself.

Also preferably, the skin comprises an inner elastomeric layer adhered to the inner surface of said translucent elastomeric layer, with said flat screen display being embedded between said translucent elastomeric layer and said inner elastomeric layer.

An advantage of this embodiment is that the display is entirely shielded off from dust or humidity. Moreover, the display can easily be completely integrated when moulding the two skin layers against the mould surface and can thus be accurately placed at the required position onto the back of the translucent layer. The display is thus protected against any damage when transferring the skin to the next mould, in particular a back foam mould, wherein the substrate is adhered to the back of the skin through the intermediary of a foam layer.

Other advantages and particularities of the present invention will become apparent from the following description of some particular embodiments of the skin according to the invention. This description is only given by way of example and is not intended to limit the scope of the invention. The reference numerals used in the description relate to the annexed drawings wherein.

Figure 2:
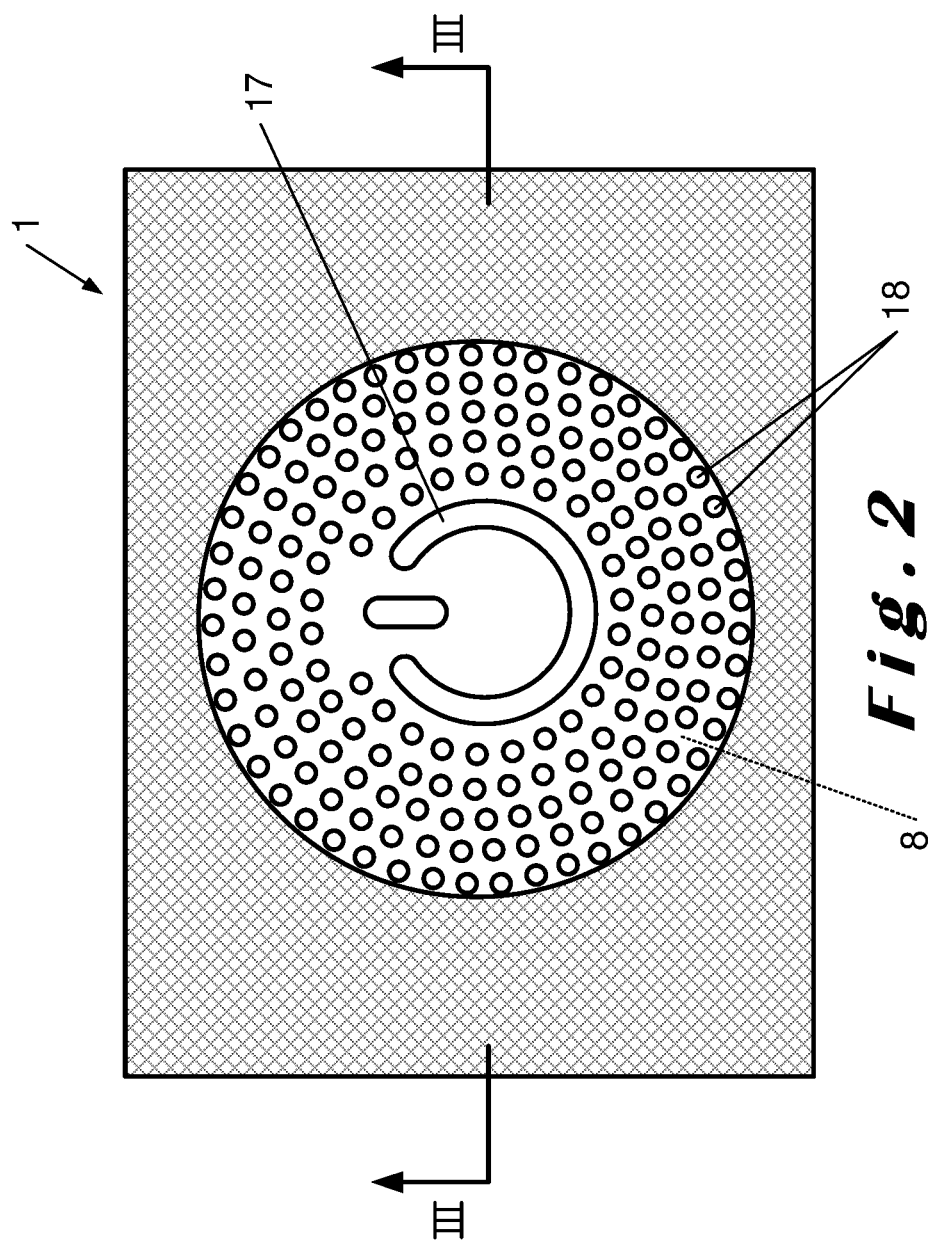
FIG. 2 is an enlarged schematic front view on a portion of the skin at the location of a first operating element with a light source, i.e. at the location of a pressure sensitive switch sensor.
Figure 4:
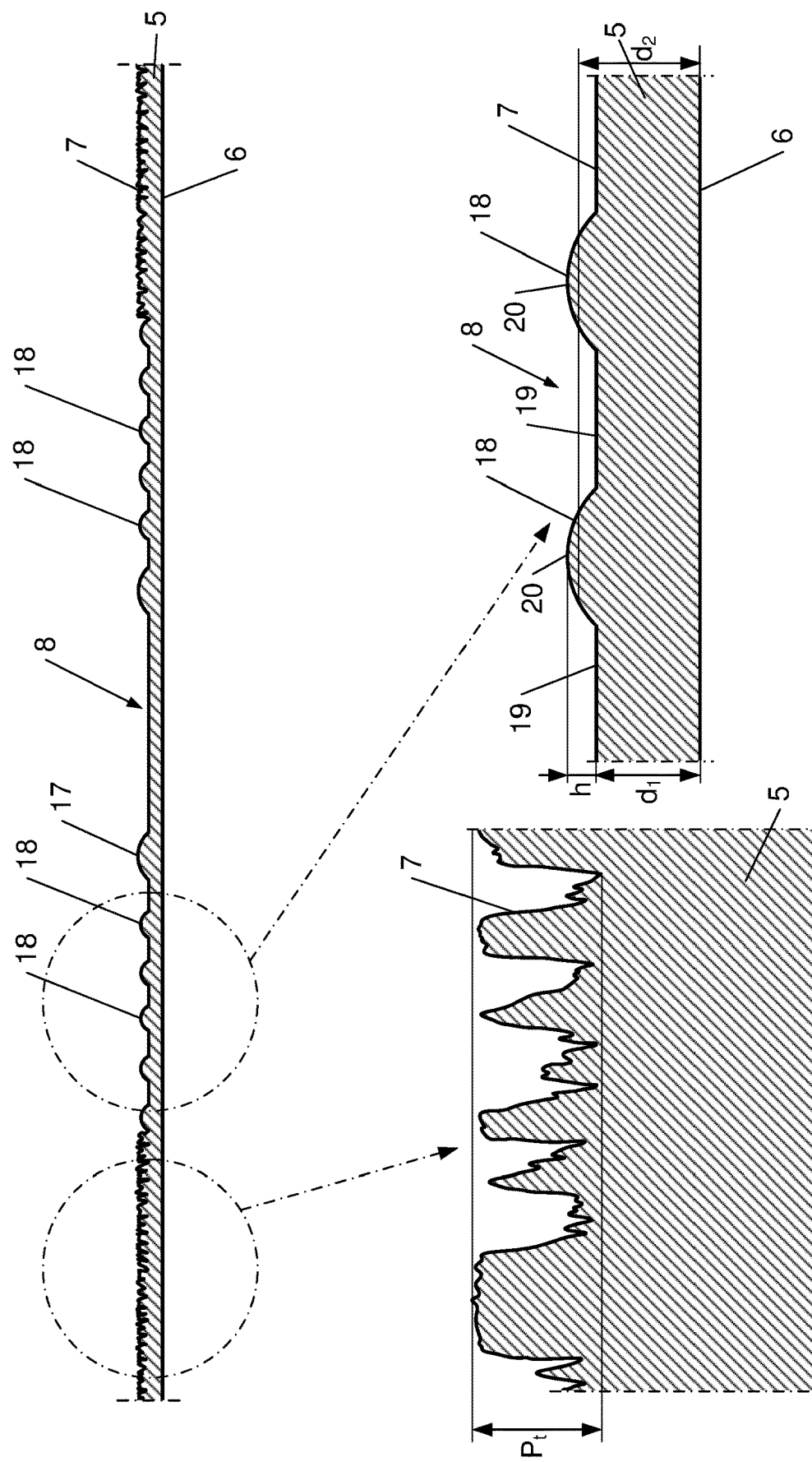
Figure 5:
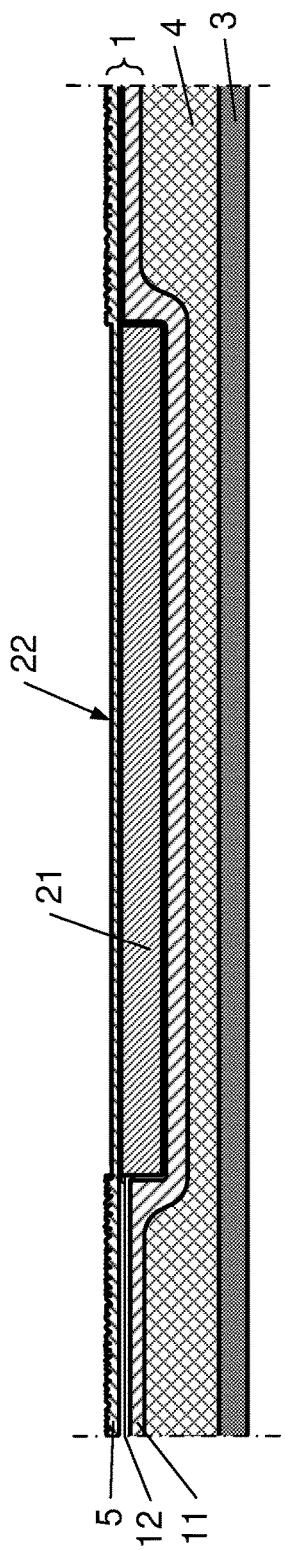
Figure 6:
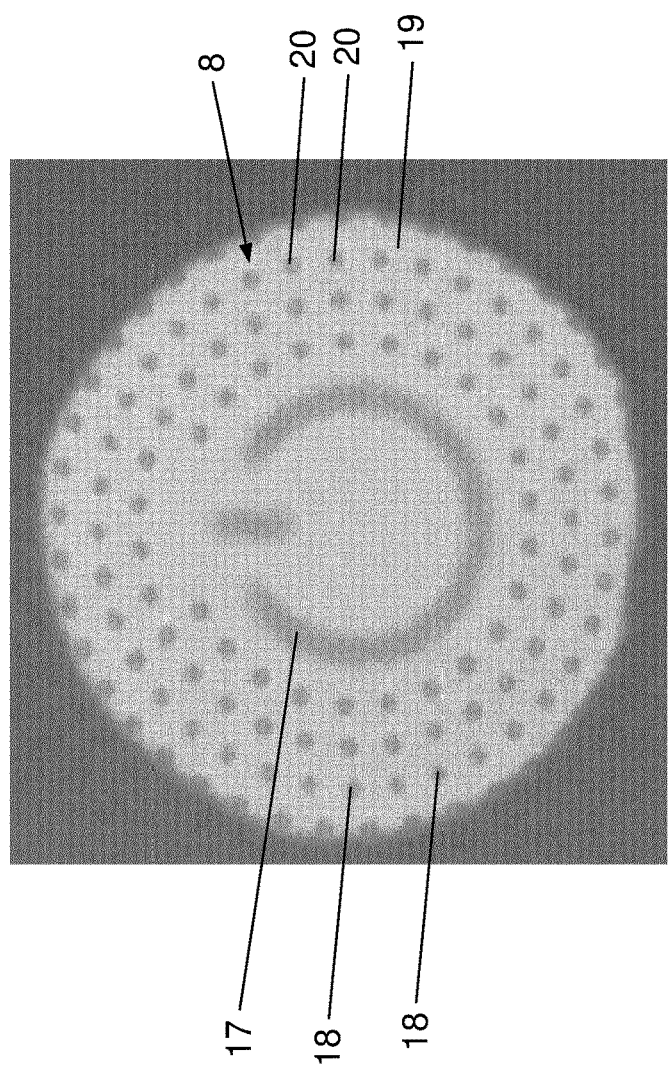

FIG. 3a is a schematic cross-sectional view through the trim part at the location of the pressure sensitive switch sensor with a light source, illustrating a surface relief on the outer surface of the translucent layer, and FIG. 3b is a schematic cross-sectional view through the trim part at the location of the pressure sensitive switch sensor with a light source, illustrating a surface relief on the inner surface of the translucent layer;

FIG. 4 is an enlarged schematic cross-sectional view through the translucent layer of the skin at the location of the pressure sensitive switch sensor;

FIG. 5 is a schematic cross-sectional view through the trim part at the location of a flat screen display which is integrated in the skin of the trim part; and FIG. 6 is a picture of the first portion of the translucent skin layer illustrated in FIG. 2 which is illuminated by the light source situated behind the translucent skin layer.

The invention generally relates to a skin 1 for a vehicle interior trim part 2 such as a dashboard, a door panel, a console, a lid of a glove compartment, etc. As can be seen in FIGS. 3 and 5, the trim part comprises the skin 1 which is adhered to a rigid substrate layer 3. The skin 1 can be adhered directly to the substrate layer 3, by means of an adhesive or by means of an overmoulding process wherein the skin 1 is moulded over the substrate layer 3 in a mould. Preferably, the skin 1 is adhered to the substrate layer 3 through the intermediary of a foam layer 4. This foam layer 4 can be produced by a moulding process in between the skin 1 and the substrate layer 3.

The skin 1 according to the present invention comprises at least a translucent elastomeric layer 5 which is preferably flexible, with an inner surface 6 and an outer surface 7 which forms the visible surface, i.e. the A-surface, of the skin 1. The translucent layer 5 is made of a plastic material which is preferably substantially homogeneously pigmented. The term plastic embraces all synthetic materials including thermosetting and thermoplastic materials. The translucent layer 5 may be a thermoplastic layer or foil, in particular a TPE (thermoplastic elastomer) layer such as a TPO or PVC skin. Such thermoplastic skin layers can be moulded by a thermoforming process or for example by a slush moulding process. The elastomeric translucent skin layer 5 can also be made starting from a curable composition, in particular a curable polyurethane composition. This curable composition is a flowable material which is applied onto a mould surface and which is allowed to cure on that mould surface to produce the translucent skin layer 5.

The curable composition can either be applied by a spray process against the surface of an open mould or it can be applied in a closed mould, more particularly poured but preferably injected in accordance with a reaction injection moulding (RIM) process. Use can be made of a light-stable coloured PU reaction mixture. Reference can be made to EP-B-0 303 305, EP-B-0 379 246, WO 98/14492, EP-B-0 929 586 and WO 04/000905, which are included herein by reference.

The translucent skin layer 5 is elastomeric which means that it has generally an elongation, measured in accordance with DIN/EN/ISO 527-3, of at least 30%, preferably of at least 50%. Its flexural modulus, measured in accordance with ASTM D790-03, is preferably smaller than 100 MPa, more preferably smaller than 75 MPa and most preferably lower than 55 MPa or even lower than 40 MPa. Generally, its overall density is larger than 300 kg/m³, preferably larger than 500 kg/m³ and more preferably larger than 600 kg/m³.

In contrast to the translucent skin layer 5, the substrate layer 3 is relatively rigid and has in particular a flexural modulus, measured according to ASTM D790, higher than 500 MPa, preferably higher than 700 MPa. Although the substrate layer can be made of a thermosetting material, the substrate is preferably made of a thermoplastic material. This thermoplastic material is preferably selected from the group consisting of PC (polycarbonate), ABS (acrylonitrile butadiene styrene) and ABS blends, in particular PC/ABS, SMA (styrene maleic anhydride), PPO (polyphenylene oxide), TPO (thermoplastic olefin), in particular PP (polypropylene), polyacetals, in particular POMs (polyoxymethylenes), nylon, polyester, acrylic and polysulfone.

The translucent layer 5 of the skin 1 according to the present invention comprises at least one first portion 8 which is configured to be placed in front of a light source 9 and to transmit visible light generated by the light source from its inner surface 6 to its outer surface 7. The light source 9 is preferably adhered to the inner surface 6 of the translucent layer 5. This is illustrated in FIGS. 3a and 3b. In the embodiment a translucent operating element 10 is additionally provided between the light source 9 and the translucent layer 5.

To adhere the light source 9 to the translucent layer 5, or the light source 9 combined with the operating element 10 when these form one part, the light source 9 can be adhered to the translucent layer 5 by means of an adhesive or it can be applied thereto during the production of the translucent layer 5, when the material of the translucent layer 5 has not yet completely cured. It is also possible to apply the light source 9 onto the substrate layer 3 and to overmould the light source 9 together with the substrate layer 3 with the liquid material used to produce the translucent layer 5.

In the embodiments illustrated in FIGS. 3a and 3b, the light source 9 is adhered to the translucent layer 5 by means of an inner elastomeric layer 11 which is produced against the inner surface of the translucent layer 5. The inner elastomeric layer 11 may have a same composition and may be produced in the same way as described hereabove for the translucent layer 5. In particular, both layers 5 and 11 can be produced as disclosed in WO 2007/137623. The translucent layer 5 is preferably produced by applying a first curable polyurethane composition onto the mould surface and the inner elastomeric layer 11 by applying a second curable polyurethane composition onto the back of the translucent layer 5.

Figure 1:
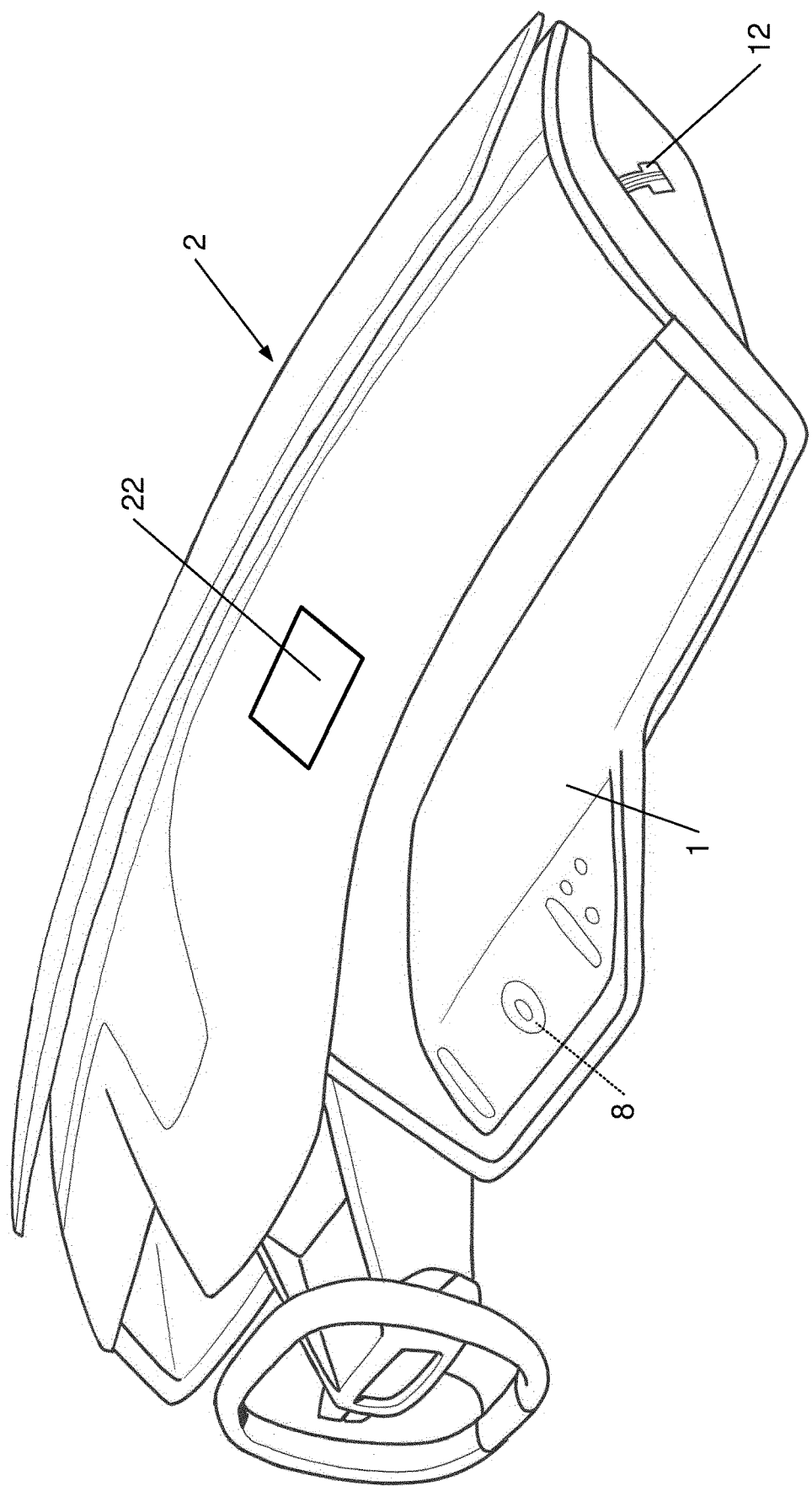
FIG. 1 is a schematic perspective view on a trim part, in particular a dashboard, which contains an elastomeric skin according to an embodiment of the present invention.

The trim part 2 illustrated in FIG. 1 is a dashboard. The dashboard 2 comprises an elastomeric skin 1 which comprises openings to integrate functional elements such as an instrument panel in the skin 1. The skin 1 also comprises an area wherein parts containing a combination of an operating element 10 and a light source 9 are integrated on the back side of the skin so that they are hidden from view if the light source 9 is not energised. The operating elements 10 and light sources 9 may be provided on an electronic printed foil 12 having a tail which sticks out of the trim part 2 so that the operating elements 10 and light sources 9 can be connected to a controller.

To avoid deformations in the area of integration when the product is exposed to different environment temperatures, the integrated printed foil has preferably a shrinkage factor similar to the elastomeric skin and/or the E-modulus (Young's modulus) should be the same or smaller than the E-modulus of the elastomeric layer. A printed foil of TPU material is very appropriate to be used in combination with elastomeric materials.

The electronic printed foil can already be foreseen of electronic surface mounted devices, like LEDs, haptic actuators, an electric coil for contactless charging, an RFID reader, an antenna, etc. The printed foil can be as well an OLED display.

A first operating element 10 may be intended to energise the different light sources 9 so that the location of the operating elements 10 becomes clearly visible. It comprises an on/off switch formed by a translucent pressure sensor 13 which has an operating surface 14. The light source 9 behind the translucent pressure sensor 13 comprises two opposite LEDs 15A and 15B. The space between the LEDs is filled with a light guiding material 16 which diffuses the light of the LEDs in different directions to create a uniform lighting of the first portion 8 of the translucent skin layer 5. The operating element 10 can additionally be covered completely or partially by a light filter which filters out certain wavelengths, e.g. to show a coloured image. Such light filters also form part of the light source 9 as they determine the wavelengths of the light which is supplied by the light source 9 to the inner surface 6 of the translucent layer 5. The LEDs 15A and 15B are energized upon initial actuation of the pressure sensor 13 to have a visual indication of the actuation of the operating element 10 and to have a clearer view on the location of the first operating element 10. Also the light sources 9 of other hidden operating elements 10 may be energized upon actuation of the first operating element 10 so that they become visible or more clearly visible to the user.

To indicate the location of the first operating element 10 when its light source 9 is not energized, the first portion 8 of the translucent skin layer 5 has preferably a first surface texture which is different from a second surface texture, i.e. the surface texture around said first portion.

Usually, the second surface texture is present over the main part of the surface of the skin. This second surface texture may be for example a leather texture or any other texture that is used for trim parts. Such a leather texture has been illustrated on a larger microscopic scale in FIG. 4. It has quite deep valleys and quite high peaks and the surface forming the peaks and the valleys is also quite rough. The surface provided with such a texture is quite matt.

As illustrated in FIG. 4, the first surface texture, i.e. the surface texture of the first portion 8 of the translucent skin layer 5 is preferably smoother than the second surface texture. In this way, the surface of this first portion 8 can be distinguished clearly from the surrounding portion of the skin layer 5, also because it has a higher gloss than the surface of the surrounding skin area.

The first surface texture may be produced against a completely smooth mould surface, i.e. against a non-textured mould surface which may even be polished. The second texture is produced against a textured area of the mould surface.

In order to indicate the location of the first operating element 10 even more clearly without illumination, a surface relief is provided on the outer surface 7 of the first portion 8 of the translucent layer 5. This surface relief is formed by surface relief elements which comprise a central icon 17, indicating the on/off switching function, surrounded by circles of dots 18 which do not only form a clear visual indication but also a clear tactile indication of the location of the first operating element 10. The dots 18 are in fact similar to the raised-points of braille but they are even larger so that they can also be felt easily by unexperienced users. Within the circular icon 17, the surface of the skin is completely smooth so that the recessed area within the circular icon 17 can be clearly felt by the user to indicate where he has to push to actuate the first operating element 10.

Without the light source 9, or when the light source is not energised, the surface relief on the first portion 8 of the translucent layer 5 can only be seen when there is sufficient ambient light, for example daylight. In accordance with the present invention, the surface relief should also be visible when there is not sufficient ambient light. The surface relief on the first portion 8 of the translucent layer 5 is therefore configured to produce an image on the first portion 8 of the translucent layer 5 by means of the visible light which is generated by the light source 9 and transmitted through the translucent layer 5 from its inner surface 6 to its outer surface 7. The image produced by the surface relief illustrated in FIGS. 2 to 4 can be seen in FIG. 6.

From the picture shown in FIG. 6, it is clear that the light source 9 does not only makes the image visible in the dark, but it also increases the visibility thereof during daytime.

In accordance with the present invention, it has been found that the desired image can be obtained by particular selections of the thickness difference caused by the surface relief and of the average spectral attenuation coefficient $\alpha_{av}$ of the pigmented plastic material of the translucent layer 5.

A test has been done by the inventors to determine the effect of the thickness of the translucent layer on the light transmittance thereof. This test has demonstrated an exponential relationship between the layer thickness and the light transmittance through the layer. The light transmittance is the ratio between the illuminance, i.e. the luminous flux (in lux) incident on one surface of the translucent layer and the luminous emittance, i.e. the luminous flux (in lux) emitted from the other surface of the translucent layer. The present inventors have found that the surface relief should preferably reduce the light transmittance of the second thicker area to at least less than 50% of the light transmittance of the first thicker area to create a clearly visible contrast between the different areas and that the larger the difference in light transmission, the better the surface relief elements can be seen.

In the embodiment illustrated in FIGS. 2 to 4, producing the image shown in FIG. 6 when the light source 9 is energised, the first portion 8 of the translucent skin layer 5 comprises at least one first area 19 wherein the translucent layer 5 has a thickness which is equal to or smaller than a first thickness $d_1$. In this embodiment the first area 19 has a smooth surface and has a thickness $d_1$ of about 0.55 mm. The first area may however show some texture or roughness, in which case the surface of the valleys, where the translucent layer has a smaller thickness, is also comprised in the first area. Due to the surface relief, the first portion 8 of the translucent skin layer 5 comprises moreover at least one second area 20 wherein the translucent layer 5 has a thickness which is equal to or larger than a second thickness $d_2$. In the embodiment of FIGS. 2 to 4, the central icon 17 and the dots 18 have a height h of about 0.17 mm so that at the location of the tops of these surface relief elements the translucent layer 5 has a thickness of about 0.72 mm. Since the dots 18 are dome shaped, only a small area of the first portion 8 of the translucent skin layer 5 has such a large thickness. The second area 20 is therefore defined as the area wherein the translucent layer 5 has a thickness which is equal to or larger than a second thickness $d_2$, which is for example equal to 0.70 mm.

In accordance with the present invention, the difference in thickness between the areas 19 and 20, which should be visually distinguishable on the first portion 8 of the translucent layer 5, i.e. the difference between the first thickness $d_1$ and the second thickness $d_2$ should be at least larger than 0.08 mm but smaller than 3.0 mm. The height h of the icon 17 and the dots 18 should thus be at least larger than 0.08 mm or preferably even at least larger than 0.10 mm.

The reduction of the light transmittance by the larger thickness $d_2$ compared to $d_1$ is not only dependent on this difference in thickness $d_2-d_1$ but is also dependent on the average spectral attenuation coefficient $\alpha_{av}$. According to the invention this average attenuation coefficient should be larger than 1 mm$^{-1}$, or preferably even larger than 2 mm$^{-1}$ or more preferably larger than 3 mm$^{-1}$ or most preferably larger than 4 mm$^{-1}$ or larger than 5 mm$^{-1}$. A larger average attenuation coefficient enables indeed to obtain a same reduction of the light transmission with a smaller difference in thickness $d_2-d_1$ of the translucent layer 5. On the other hand, the average spectral attenuation coefficient $\alpha_{av}$ should be smaller than 25 mm$^{-1}$, or preferably even smaller than 20 mm$^{-1}$ or more preferably smaller than 15 mm$^{-1}$ or most preferably smaller than 10 mm$^{-1}$. In this way, the thickness $d_1$ of the first thin area 19 can still be large enough, without requiring a too strong light source, to provide the required mechanical properties to the translucent skin layer 5.

The average spectral attenuation coefficient $\alpha_{av}$ is to be determined based on the transmittance of a film (sheet) of the pigmented plastic material of the translucent layer 5 which has a uniform thickness which is equal to said first thickness $d_1$. EN ISO 13468-2:2006 part 2 discloses how to measure the spectral transmittance $T_1(\lambda)$, i.e. the total transmittance for monochromatic radiation of a given wavelength $\lambda$, in intervals of 5 nm, for the whole range of visible wavelengths, i.e. from 380 nm to 780 nm.

In accordance with the present invention, the spectral attenuation coefficient is then to be determined for each of the wavelengths $\lambda$ with the formula (I):

$$\alpha(\lambda) = -\frac{\ln T_1(\lambda)}{d_1}.$$

The average spectral attenuation coefficient $\alpha_{av}$ can then be determined as the mathematical average of these different spectral attenuation coefficients $\alpha(\lambda)$.

The average spectral attenuation coefficient $\alpha_{av}$ can then be calculated for the whole range of visible light wavelengths. This can be done especially when the light source 9 behind the first portion 8 of the translucent layer 5 emits white light, i.e. light which comprises all of the wavelengths between 380 and 780 nm. However, when the light source 9 emits light which comprises a narrower range of wavelengths, the average spectral attenuation coefficient $\alpha_{av}$ should preferably be determined over this narrower range of wavelengths. If two or more light sources 9, emitting light which comprises different ranges of wavelengths, are provided behind the translucent layer 5, different average spectral attenuation coefficients $\alpha_{av}$ should preferably be determined, namely as an average over the different ranges of wavelengths, so that the differently coloured images are preferably all produced in accordance with the present invention.

Apart from the above described selection of the range of thickness differences $d_2-d_1$ and of the range of average spectral attenuation coefficients determined over the range of wavelengths emitted by the light source (or light sources), a further requirement which has to be met is that $\alpha_{av}$ and/or $d_2-d_1$ should be sufficiently large so that $\alpha_{av}(d_2-d_1) \geq -\ln a$, with the value a being equal to 0.50 (ln a being the $\log_e$ value or the natural logarithm of a).

It was found that when the transmittance $T_1$ of a film (sheet) of the translucent plastic material with the thickness $d_1$ is defined by the following formula:

$$T_1 = e^{-\alpha_{av} d_1};$$

then the transmittance $T_2$ of a film (sheet) of the translucent plastic material with the larger thickness $d_2$ corresponds at least substantially to the value obtained by the following formula:

$$T_2 = e^{-\alpha_{av} d_1} \cdot e^{-\alpha_{av}(d_2-d_1)} \text{ or}$$

$$T_2 = T_1 \cdot e^{\alpha_{av}(d_2-d_1)}.$$

When a is equal to 0.50, the transmittance of the second thicker area 20 is thus at least about 50% smaller than the transmittance of the first thinner area 19. This makes the second area 20 clearly visually distinguishable from the first area 19 when the light source 9 is energised. Preferably, a larger contrast between the first 19 and the second area 20 is obtained by reducing the value a to equal to 0.45, preferably equal to 0.40, more preferably equal to 0.35 and most preferably equal to 0.30. For these a values, the reduction of the transmittance of the thicker area 20 corresponds substantially to a reduction of respectively 55%, 60%, 65% and 70%.

As described already here above, in the embodiment illustrated in FIGS. 2 to 4, producing the image shown in FIG. 6, the thickness $d_1$ of the first thinner area 19 is equal to about 0.55 mm whilst the thickness $d_2$ of the second thicker area 20 is equal to 0.70 mm (or locally even somewhat larger up to at most 0.72 mm). The pigmented translucent polyurethane material of this translucent skin layer has an average spectral attenuation coefficient $\alpha_{av}$, measured over the whole range of visible light wavelengths, of about 6.9 mm$^{-1}$. The transmission $T_2$ is therefore at least about 64% smaller (up to about 69% smaller for a thickness difference of 0.17 mm) than the transmission $T_1$, which produces, as can be seen in FIG. 6, a clear visual distinction between the first thinner area 19 and the second thicker areas 20.

Based on the formula $T_1 = e^{-\alpha_{av} d_1}$ it can be calculated that the transmittance of the first thinner area 19 is equal to about 0.022 or in other words about 2.2%. The image produced with a light source of 1500 lux as illustrated in FIG. 6 can be seen clearly in the dark or in a slightly illuminated room but is less visible in daylight. When including less pigment in the pigmented plastic material so that the average spectral attenuation coefficient of this material is reduced to 6.2 mm$^{-1}$, corresponding to a transmittance of about 0.033, the image could be seen better in an well illuminated room and could even be seen, although less clear, in full daylight.

In the embodiment illustrated in FIGS. 2 to 4, the relief elements which produce the surface relief, i.e. the central icon 17 and the dots 18, provide the second thicker areas 20 of the first portion 8 of the translucent layer 5. Alternatively, the translucent layer 5 could be made thicker and the surface relief elements 17 and 18 could be formed by depressions in the outer surface 7 of the translucent layer 5 forming the first thinner areas 19 of the translucent skin layer 5. In this way, the surface relief elements 17 and 18 would become visible as lighter areas within a darker background.

When the translucent layer 5 would be produced against the surface of the rigid part containing the light source 9 and any operating element 10, the surface relief could also be formed on the inner surface 6 of the translucent layer 5. In this way, as a result of the difference in transmittance produced again by the surface relief, an image would also be obtained on the outer surface 7 of the translucent layer 5 when the light source 9 is energised. A negative of the surface relief could be provided on the surface of the light source which is directed towards the translucent layer and the translucent layer could be produced for example by a reaction overmoulding process partially against that surface of the light source. It is also possible to provide a surface relief both on the inner 6 and onto the outer surface 7 of the translucent layer 5.

Due to the fact that the translucent layer 5 is made of a pigmented material having said average spectral attenuation coefficient, it is also possible to provide a flat screen display on the back of the translucent layer 5. Such a flat screen display 21 has been illustrated schematically in FIGS. 1 and 5. The illustrated flat screen display comprises a flexible OLED screen 21 which is adhered to the inner surface 6 of a second portion 22 of the translucent layer 5. Due to the relatively small thickness of the translucent layer 5 and of the relatively small attenuation coefficient thereof, the images produced by the flat screen display 21 can be seen through the translucent layer 5.

The outer surface 7 of the second portion 22 of the translucent layer 5 is preferably completely smooth or it may show some surface texture or roughness so that it is less glossy and matches better with the surrounding surface area so that it is less visible when the display 21 is not energised.

Preferably, the inner 6 and the outer surface 7 of said second portion 22 of the translucent layer 5 have a surface texture which is completely smooth or which has a Pt value, measured in accordance with DIN EN ISO 4287:1998, which Pt value, in mm, meets the following formula (III):

$$Pt < -\frac{\ln b}{\alpha_{av}}$$

wherein b is larger than 0.50, preferably larger than 0.60 and more preferably larger than 0.70 and wherein the average spectral attenuation coefficient ($\alpha_{av}$) is preferably determined for any range of visible light wavelengths emitted by the flat screen display.

The difference in light transmittance between the peaks of said texture and the valleys thereof is therefore smaller than about 50%, or preferably smaller than 40% or smaller than 30%. Locally, a relief element can be provided in the second portion 22 of the translucent layer 5 to provide an additional image thereon in front of the image created by the flat screen display 21.

As can be seen in FIGS. 3 and 5 the different light sources 9 and the flat screen display 21, are preferably embedded between the translucent layer 5 and the inner elastomeric layer 11. The light source 9 or the flat screen display 21 is thus adhered to the translucent layer 5 by means of the inner elastomeric layer 11, even when the light source 9 or the flat screen display 21 do not stick themselves to the translucent layer 5.

The invention claimed is:

1. A skin for a vehicle interior trim part, which skin comprises at least a translucent elastomeric layer composed of a pigmented plastic material, the translucent elastomeric layer having an outer surface and an inner surface opposite the outer surface, and the translucent elastomeric layer comprising at least one first portion which is configured to be placed in front of a light source and to transmit visible light generated by said light source from said inner surface to said outer surface,
   wherein said first portion of the translucent elastomeric layer comprises a surface relief to produce an image on said first portion when said visible light is transmitted through said first portion of the translucent elastomeric layer, which surface relief forms at least one first area, where the translucent elastomeric layer has a thickness which is smaller than or equal to a first thickness ($d_1$) and at least one second area, where the translucent elastomeric layer has a thickness which is larger than or equal to a second thickness ($d_2$) which is larger than said first thickness ($d_1$), with the difference ($d_2-d_1$) between said first thickness ($d_1$) and said second thickness ($d_2$) larger than 0.08 mm but smaller than 3.0 mm, and
   said pigmented plastic material has over at least one range of visible light wavelengths an average spectral attenuation coefficient ($\alpha_{av}$), which average spectral attenuation coefficient is the average of spectral attenuation coefficients ($\alpha(\lambda)$) determined for different wavelengths ($\lambda$) in regular intervals over said range of visible wavelengths by the following formula:

$$\alpha(\lambda) = -\frac{\ln T_1(\lambda)}{d_1}$$

wherein:

$d_1$ = said first thickness; and $T_1(\lambda)$ = the spectral transmittance at said wavelength ($\lambda$), measured in accordance with EN ISO 13468-2:2006 part 2, of a film of said pigmented plastic material having a uniform thickness equal to said first thickness ($d_1$), said average spectral attenuation coefficient ($\alpha_{av}$) being comprised between 1.0 and 25 mm$^{-1}$ and being related to the difference ($d_2-d_1$) between said first ($d_1$) and said second thickness ($d_2$) according to the following formula:

$$\alpha_{av}(d_2-d_1) > -\ln 0.50.$$

2. The skin according to claim 1, said average spectral attenuation coefficient ($\alpha_{av}$) being comprised between 1.0 and 25 mm$^{-1}$ and being related to the difference ($d_2-d_1$) between said first ($d_1$) and said second thickness ($d_2$) according to the following formula:

$$\alpha_{av}(d_2-d_1) > -\ln 0.40.$$

3. The skin according to claim 1, wherein the difference ($d_2-d_1$) between said first thickness ($d_1$) and said second thickness ($d_2$) is larger than 0.10 mm.

4. The skin according to claim 1, wherein the difference ($d_2-d_1$) between said first thickness ($d_1$) and said second thickness ($d_2$) is smaller than 2.0 mm.

5. The skin according to claim 1, wherein said average spectral attenuation coefficient ($\alpha_{av}$) is larger than 2.0 mm$^{-1}$.

6. The skin according to claim 1, wherein said average spectral attenuation coefficient ($\alpha_{av}$) is smaller than 20.0 mm$^{-1}$.

7. The skin according to claim 1, wherein said first portion of the translucent elastomeric layer has an average thickness which is smaller than 2.0 mm.

8. The skin according to claim 1, wherein said first portion of the translucent elastomeric layer has an average thickness which is larger than 0.2 mm.

9. The skin according to claim 1, wherein said range of visible light wavelengths has a width of at least 50 nm.

10. The skin according to claim 9, wherein said range of visible light wavelengths is the range from 380 to 780 nm.

11. The skin according to claim 1, wherein said first portion of the translucent elastomeric layer comprises said surface relief on the outer surface thereof.

12. The skin according to claim 1, wherein the skin comprises at least one light source which is adhered to the inner surface of said first portion of the translucent elastomeric layer and which is configured to emit visible light having a predetermined range of wavelengths, said range of visible light wavelengths corresponding to this predetermined range of wavelengths.

13. The skin according to claim 12, wherein the skin comprises an inner elastomeric layer adhered to the inner surface of said translucent elastomeric layer, with said light source being embedded between said translucent elastomeric layer and said inner elastomeric layer.

14. The skin according to claim 13, wherein said light source comprises at least one LED which is embedded between said translucent elastomeric layer and said inner elastomeric layer.

15. The skin according to claim 1, wherein the skin comprises a flat screen display which is adhered to the inner surface of a second portion of the translucent elastomeric layer, which second portion is configured to transmit visible light generated by said flat screen display from said inner surface to said outer surface.

16. The skin according to claim 15, wherein the inner and the outer surface of said second portion of the translucent elastomeric layer have a surface texture which is completely smooth or which has a Pt value, measured in accordance with DIN EN ISO 4287:1998, which Pt value, in mm, meets the following formula:

$$Pt < -\frac{\ln b}{\alpha_{av}}$$

wherein b is larger than 0.50.

17. The skin according to claim 15, wherein the skin comprises an inner elastomeric layer adhered to the inner surface of said translucent elastomeric layer, with said flat screen display being embedded between said translucent elastomeric layer and said inner elastomeric layer.

18. The skin according to claim 1, wherein said first portion of the translucent elastomeric layer comprises said surface relief on the inner surface thereof.

19. The skin according to claim 1, wherein said average spectral attenuation coefficient ($\alpha_{av}$) being comprised between 1.0 and 25 mm$^{-1}$ and being related to the difference ($d_2-d_1$) between said first ($d_1$) and said second thickness ($d_2$) according to the following formula:

$$\alpha_{av}(d_2-d_1) > \ln 0.30.$$

\* \* \* \* \*